United States Patent [19]

Shaw

[11] Patent Number: 4,666,396
[45] Date of Patent: May 19, 1987

[54] THERMALLY INSULATED HEATED SPRUE BUSHING IN PLASTIC MOLDING APPARATUS

[76] Inventor: Richard J. Shaw, 13525 W. Keefe, Brookfield, Wis. 53005

[21] Appl. No.: 817,145

[22] Filed: Jan. 8, 1986

Related U.S. Application Data

[63] Continuation-in-part of Ser. No. 443,244, Nov. 22, 1982, abandoned.

[51] Int. Cl.$^4$ .................. B29C 45/27; B29C 45/74
[52] U.S. Cl. .................................... 425/549; 219/200; 219/421; 219/523; 425/568
[58] Field of Search ............... 252/62; 219/200, 421, 219/523; 528/388; 425/549, 568

[56] References Cited

U.S. PATENT DOCUMENTS

| | | | |
|---|---|---|---|
| 2,227,263 | 12/1940 | Knowles | 425/190 |
| 2,227,966 | 1/1941 | Emsley | 249/68 |
| 2,828,509 | 4/1958 | Smucker | 425/552 |
| 3,113,346 | 12/1963 | Bright | 425/569 |
| 3,537,139 | 11/1970 | Segmüller | 425/549 |
| 3,819,312 | 6/1974 | Arpajian | 425/242 |
| 3,945,535 | 3/1976 | Leiste | 222/146 HE |
| 4,172,042 | 10/1979 | Kiisler et al. | 252/62 |
| 4,173,448 | 11/1979 | Rees et al. | 425/562 |
| 4,176,098 | 11/1979 | Needham | 524/451 |
| 4,260,348 | 4/1981 | Graham | 425/144 |
| 4,268,241 | 5/1981 | Rees et al. | 425/549 |
| 4,273,525 | 1/1981 | Reitan | 425/549 |
| 4,279,588 | 7/1981 | Gellert | 425/549 |

Primary Examiner—Willard E. Hoag
Attorney, Agent, or Firm—Robert T. Johnson

[57] ABSTRACT

This invention is to disclose an insulated heated sprue bushing in plastic molding apparatus, and comprises a plastic molded segment as a thermal barrier to insulate or break the heat flow between the sprue bushing shoulder and neck section of the stem of the sprue bushing, and a heater band placed on the head of the sprue bushing.

3 Claims, 8 Drawing Figures

THERMALLY INSULATED HEATED SPRUE BUSHING IN PLASTIC MOLDING APPARATUS

This is a continuation-in-part of application No. 06/443,244 filed Nov. 22, 1982 and now abandoned.

Apparatus for molding of thermoplastics, particularly injection molding, comprises dies mounted on die blocks which blocks in turn are mounted on the platens of a press. Molten or plasticized material is forced by pressure out of a nozzle through a sprue bushing which sprue bushing serves to transmit or conduct the plasticized material from the nozzle to the runners which feed the plasticized material to the various cavities, which cavities are at a reduced temperature to solidify the plastic formed in the die.

There is, however, a problem in molding thermoplastics as outlined above, in that due to the temperature difference between the nozzle and the sprue bushing, it is necessary to heat the material at the nozzle to an excessively high temperature in order to be sure the plasticized material or compound will feed into the cooled or reduced temperature die. The high temperature required as indicated above can cause break down of the plasticized material, while without adequate heating, cold spots develop on passage from the nozzle through the sprue bushing into the runners, and inhibit flow into the cavities.

As for injection molding of thermoset compounds, it is important that the sprue bushing be insulated from the heated die to prevent premature curing or "setting" of the plasticized material or compound prior to filling of the molding cavities.

In view of above mentioned problems, a thermally insulated heated sprue bushing is useful in correcting said problems in thermoplastic and thermoset molding, but more especially in molding of thermoplastic compounds, wherein a heater band is mounted around the periphery of the head of the sprue bushing, and the thermal insulation comprises a molded segment inserted between sprue bushing stem shoulder section and the die block mount section.

Several U.S. patents have been issued pertaining to various sprue bushings, and molding apparatus as follows:

U.S. Pat. No. 2,227,966 to Emsley for "Injection Type Mold", which states: An object of the invention is to substantially retard cooling of the thermoplastic composition in the gate and/or runners, until after the article in the mold cavity is hardened, which is done with a dead air chamber around the gate bushing.

U.S. Pat. No. 2,828,509 to Smucker, et al. for "Plastic Molding Machines". This covers a plastic molding machine, with the nozzle extending to the molding cavity. The nozzle is merely guided to the seat of the bushing for filling of the die.

U.S. Pat. No. 2,537,139 to Segmüller for "Injection Nozzle for Hot Channel-Injection Molding Device". This patent covers a heat conducting core located internally of each delivery channel. This is to heat the material going or flowing from the nozzle to the molding dies or cavities.

U.S. Pat. No. 3,945,535 to Leiste et al. for "Injection Molding Apparatus". This patent covers apparatus for injecting plasticized material containing a foaming agent into a mold from an extruder, and a heating element to maintain the nozzle needle at high temperature.

U.S. Pat. No. 4,260,348 to Graham, for "Sprue Bushing For Injection Molding Machine". This patent describes a sprue bushing, the temperature of which is controlled by water flowing through channels in the bushing.

U.S. Pat. No. 4,273,525 to Reitan for "Injection Mold Bushing", which describes a sprue bushing having heating and cooling means.

U.S. Pat. No. 4,173,448 to Rees for "Actuating Mechanism For Gate Valve of Injection Nozzle". This discloses a flow channel for molten plastic material, and thus does not touch this Shaw invention.

U.S. Pat. No. 4,268,241 to Rees for "Heated Injection Nozzle". This invention discloses a nozzle for the injection of liquified plastic material.

It is an object of this present invention to describe a heated sprue bushing thermally insulated from the die mounting block so that the plasticized thermoplastic compound maintains its temperature for more efficient molding operation, without excess heating of said thermoplastic compound.

Another object of this invention is to disclose means to thermally insulate the sprue bushing from the die in molding of plastic materials, by means of a thermal barrier at the shoulder of said sprue bushing and also a heater band placed around the head of the insulated sprue bushing.

Another object of this invention is to reduce the temperature difference which exists between the nozzle and sprue bushing in injection molding. This invention is to disclose means for thermally insulating the sprue bushing from the die block, such that the plasticized or melted material will maintain more closely its temperature coming out of the nozzle and going through the heated sprue bushing.

Another object of this invention is to prevent excessive temperature variance of the plasticized compound or material on being fed into and through a thermally insulated and heated sprue bushing.

Another object of this invention is to disclose in a plastic molding apparatus comprising a die mounted in a press, the improvement consisting of a thermally insulated and heated sprue bushing mounted in said die, said sprue bushing insulated from the die block at the shoulder and stem section of said sprue bushing, and a heater element band formed around the head of the thermally sprue bushing.

Another object of this invention is to prevent nozzle "freeze off" by means of a heated, thermally insulated sprue bushing.

Another object of this invention is to disclose a sprue bushing with a thermally insulating segment molded thereon, said segment extending from the head of sprue bushing to a segment of the stem of sprue bushing.

Another object of this invention is to disclose a thermally insulating collar for a heated sprue bushing mounting, said insulating collar to be removable from said sprue bushing, and said sprue bushing having a heater band around head of sprue bushing.

Another object of this invention is to reduce the temperature difference between the nozzle and sprue bushing in plastic molding, by means of a thermally insulated sprue bushing and a heater band on the sprue bushing head.

BRIEF DESCRIPTION OF THE DRAWINGS

FIG. 1—Side View of sprue bushing with insulating section, wherein:

1. Stem of sprue bushing
2. Passage way through sprue bushing
3. Thermal insulating section
4. Seat for press nozzle
5. Head of sprue bushing
6. Die block mount section
9. Electric wires to heater band
10. Heater band
12. Space between heater band and inside diameter of sprue head well
13. Sprue bushing orifice FIG. 2—End View of sprue bushing and insulating section wherein:
1. Stem of sprue bushing
2. Passage way through sprue bushing
3. Insulating section
4. Seat for nozzle of injection press
5. Head of sprue bushing FIG. 3—End View of insulating section ring wherein:
7. Sprue bushing thermal insulator sleeve
8. Shoulder section of thermal insulating section FIG. 4—Side View of sprue bushing mounted in die with insulating section in position at the shoulder of said sprue bushing wherein:
1. Stem of sprue bushing
2. Passage way through sprue bushing
4. Seat for nozzle of injection press
5. Head of sprue bushing
6. Die block mount section
7. Sprue bushing thermal insulator sleeve
8. Shoulder section of insulator
9. Electric wires to heater band
10. Heater band
12. Space between heater band and inside diameter of sprue head well
13. Sprue bushing orifice
14. Thermal insulating ring section well FIG. 5—Side View of thermally insulated sprue bushing and heater band wherein:
1. Stem of thermally insulated sprue bushing
2. Passage way through insulated sprue bushing
3. Thermal insulating section
4. Seat for nozzle of injection press
5. Head of sprue bushing
9. Electric wires to heater band
10. Heater band
13. Sprue bushing orifice FIG. 6—Side view of opening in die block mount for sprue bushing wherein:
6. Die block mount section
11. Diameter of well in die block FIG. 7—End view die block well and fitting of heater band on head of thermally insulated sprue bushing wherein:
4. Seat for nozzle of injection press
5. Head of sprue bushing
6. Die block mount section
9. Electric wires to heater band
10. Heater band
11. Diameter of well in die block
12. Space between heater band and inside diameter of sprue head well
13. Sprue bushing orifice FIG. 8—Side elevation view of opening in the die block mount section for mounting of thermally insulated heated sprue bushing wherein:
6. Die block mount section
11. Diameter of well in die block
14. Thermal insulating ring section well FIG. 1 shows the plastic insulating material molded onto the sprue bushing which had been machined "out" so that the plastic insulating material is molded onto the sprue bushing in the machined out section, and the heater band is placed around the head of the sprue bushing.

DESCRIPTION OF INVENTION

Figure 2:
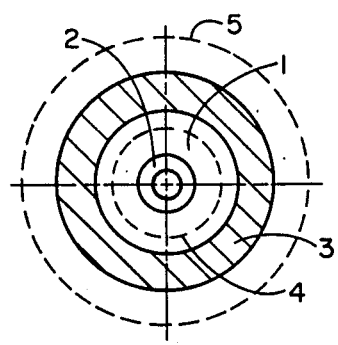

In all of the description of this invention which follows, it is to be pointed out that the improvement consists of an electric heater band placed around the head of a thermally insulated sprue bushing for improved plastic molding apparatus. For purpose of discussion, when the term "heated sprue bushing" is stated, this is to mean an electric band heater is mounted on the outer periphery on the head of sprue bushing 5.

This invention discloses a thermally insulated heated sprue bushing in plastic molding apparatus, and includes the mounting of a heater band 10, on the head of sprue bushing 5.

In particular, the sprue bushing is thermally insulated from the die at its shoulder and stem section and a heater band is placed around the periphery of the sprue bushing head so that as plastic compound is forced from the press nozzle to and through the sprue bushing that the temperature of the compound is not adversely affected to cause problems in molding.

For example, in molding of thermoplastic compounds, the die temperature is below the congealing or freezing temperature of the plastic material. In conventional molding the sprue bushing is at or near the die temperature, thus when melted plastic compound is injected from the nozzle into and through the sprue bushing that the temperature of the melted plastic is reduced causing flow problems from the sprue bushing due to congealing or higher viscosity of the melt into the runners through the die gates and into the cavities of the dies.

In thermoset molding, the die is at a high temperature for cure of the compound such as phenolic melamine or alkyd compound.

The temperature of the die in thermoset molding is in the vicinity of 325°–360° F., thus in conventional molding the sprue bushing is at or near this temperature.

Thus when plasticized thermoset material is forced from the nozzle through the sprue bushing into runners through gates and into the dies, there is often a problem of filling the dies due to pre-cure and cessation of flow of the compound on going through the sprue bushing.

Attempts have been made to eliminate the above problems, and surprisingly it has been found that insulating a sprue bushing shoulder and a section of the stem from the die, that fill of the dies are readily accomplished, and the problem of "freeze off" is eliminated.

On thermally insulating the heated sprue bushing from the die as mentioned above, the nozzle temperature of thermoplastic compounds can be reduced, and other advantages obtained as indicated in the five examples listed as follows:

Case 1. Adaptor of 6/6 40% GF Nylon a. reduced nozzle temperature from 625° to 520° F.
b. eliminate small bent cores from cold flow resin.
c. improved flatness & surface appearance.
d. eliminated gas trapping.
e. eliminated sprue sticking.
f. eliminated nozzle freeze-off.

Case 2. Fuse Holder of 30% Glass filled PBT a. reduced nozzle temperature from 500° to 450° F.
b. Eliminated nozzle freeze-off.
c. eliminated sprue sticking.
d. eliminated voids in thick section.
e. eliminated critical knit line of cored hole.
f. improved resin reprocessability.

Case 3. Handle of high impact ABS a. eliminated sticking sprue.
b. reduced splay and lamination.
c. eliminated subgate plugging.
d. improved overall part appearance.
e. reduced nozzle temperature from 480° to 420° F.

Case 4. Cover 30% Glass filled PBT SEO* a. reduced nozzle temperature from 490° to 430° F.
b. eliminated sticking sprue.
c. eliminated splay and streaking.
d. improved part flatness.

Case 5. Cover SEO Polycarbonate a. reduced nozzle temperature from 590° to 530° F.
b. eliminated sprue sticking.
c. eliminated splay and streaking.

*SEO - Self Extinguishing, zero burning

The above reduced temperatures indicated energy savings obtained by this invention.

Figure 1:
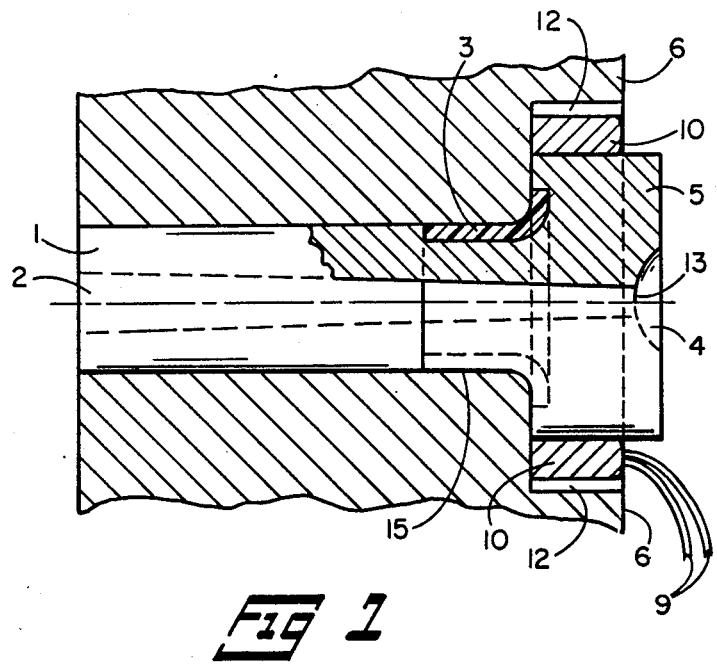

There are two ways to thermally insulate the bushing shoulder and section of the stem; one method is to machine out a section of the sprue bushing and form the insulating section 3 by injection molding compound to fill the machined out segment of the shoulder and section of the stem. The molded segment will be of the same diameter as the sprue bushing stem, see FIG. 1. The thickness of the molded section is of the order of 0.100" to 0.200".

Figure 4:
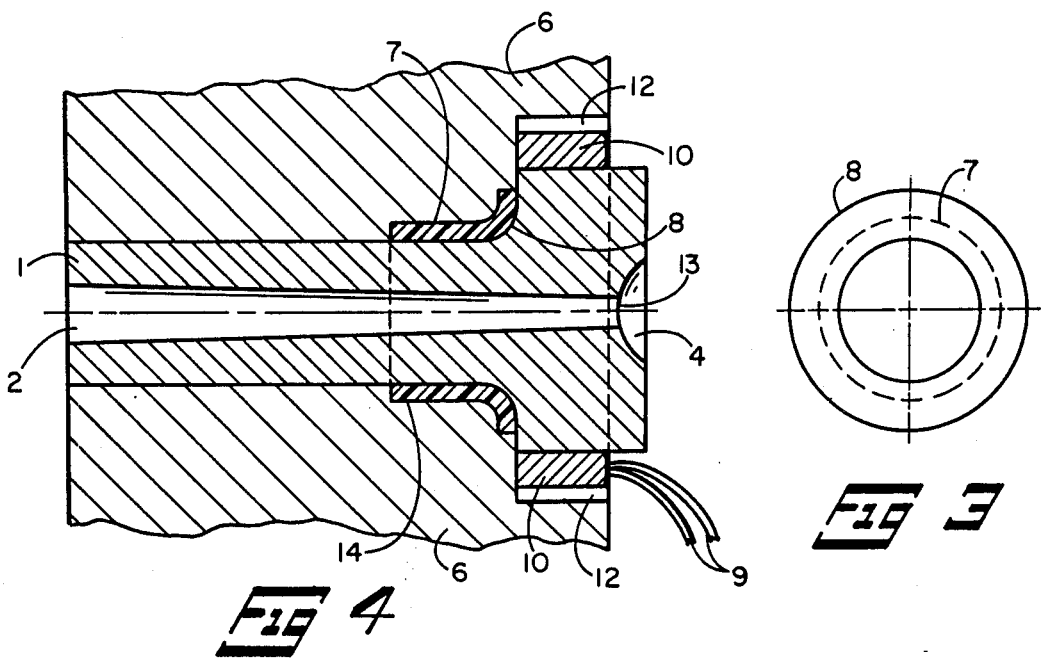
FIG. 4 shows the plastic insulating material as a separate ring and shoulder section to be inserted in thermal insulating ring section well 14, in a machined out portion of the die block mount section. The sprue bushing is then inserted in above mentioned thermal insulating ring section well 14 in the die block mount section 6, holding or positioning the insulating section between said die block and the sprue bushing section, and heater band 10 is placed around the head of the sprue bushing 5.
Figure 3:
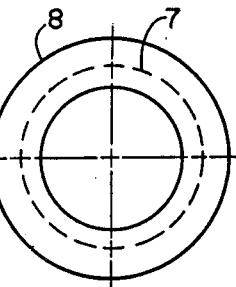
Figure 5:
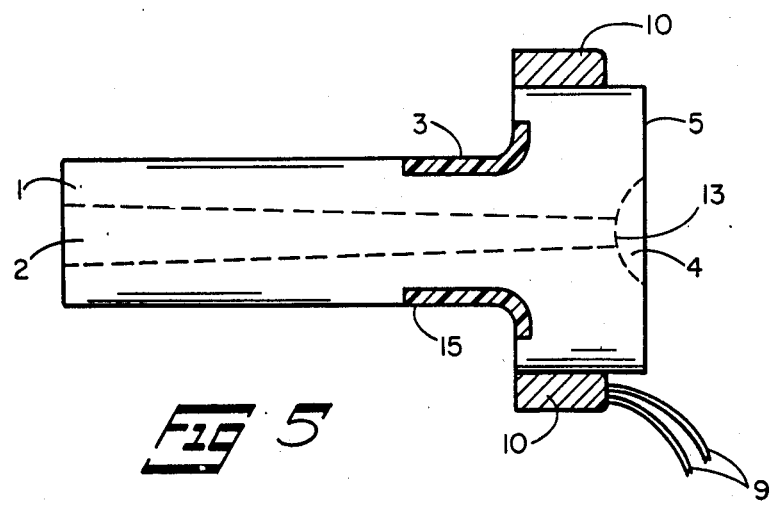
Figure 6:
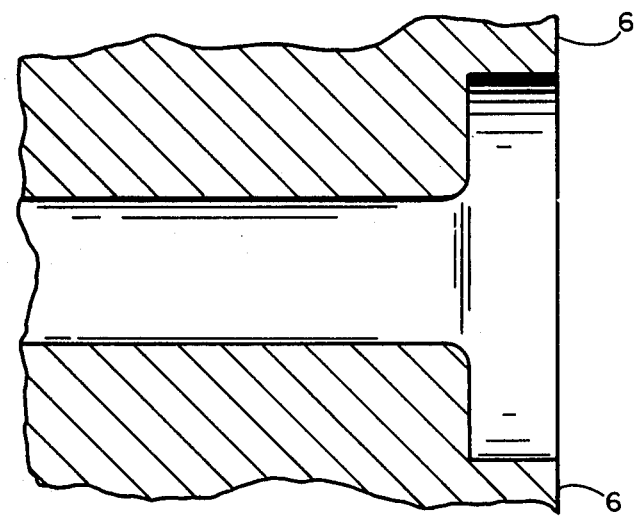
Figure 7:
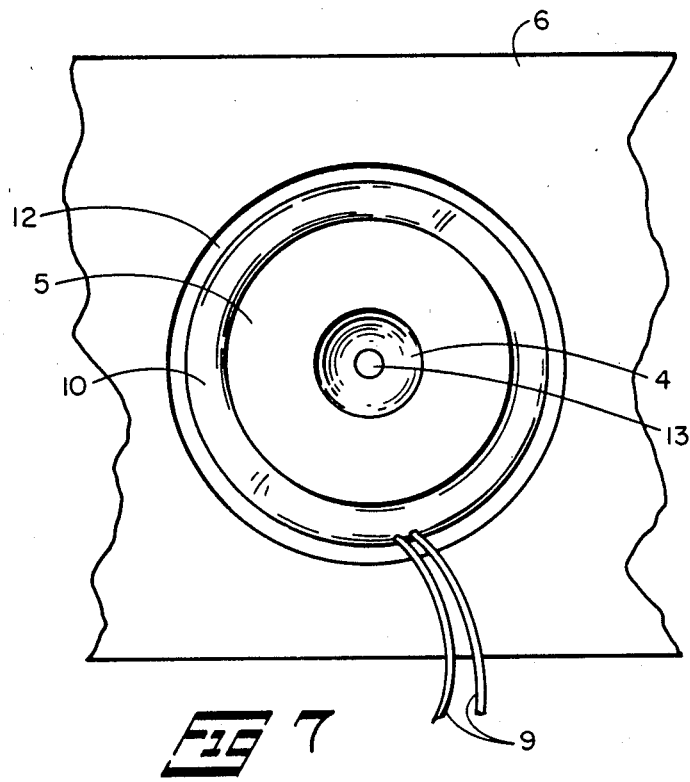
Figure 8:
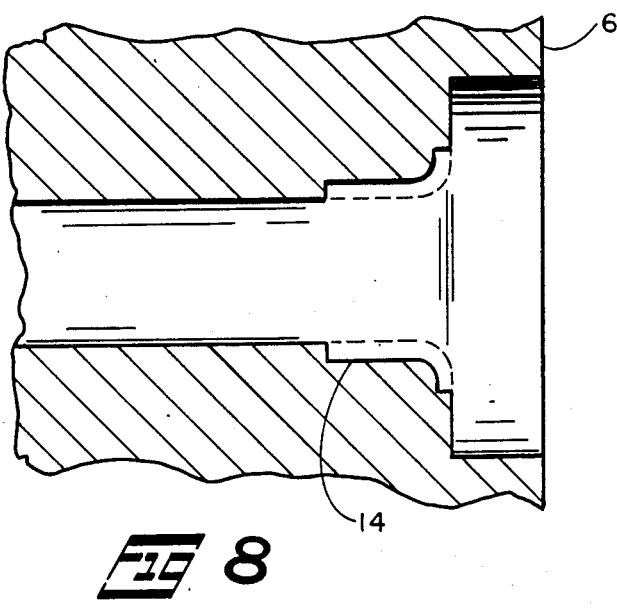

Another method of thermally insulating the shoulder and section of stem of the sprue bushing is to insert a molded cylindrical section called thermal insulation section ring sleeve 7 or thermal barrier to be mounted between the shoulder 8 and stem 1 section of the sprue bushing and the die block mount section, as shown in FIG. 4.

With this alternate method of insulating the sprue bushing section from the die block mount section 6, there is disclosed a thermal insulating ring section well 14, as a machined out step in the die mount block section 6, to allow fitting of sprue bushing thermal insulator sleeve 7 in said thermal insulating ring section well 14 machined out of die block mount section 6, to allow fitting of stem of sprue bushing 1 through said sprue bushing thermal insulator sleeve 7.

With this second method of insulating the sprue bushing section from the die block requires a thermal insulating ring section well 14 as a machined step on the die block mount section to allow fitting of the insulating ring 7 in the die block to then allow mounting of the sprue bushing therein.

It is to be pointed out this invention discloses a thermally insulated heated sprue bushing in plastic molding apparatus wherein the improvement consists of a sprue bushing thermal insulator sleeve 7, mounted in thermal insulating ring section well 14 in die mount block section 6 and stem of sprue bushing 1, extending through said sprue bushing thermal insulator sleeve 7, and the head of sprue bushing 5 in contact with shoulder section 8, of sprue bushing insulator sleeve 7, and a heater band 10, mounted around the periphery of head of sprue bushing (5).

This section ring insulation 3 or sleeve 7, otherwise known as a thermal barrier, can be molded of phenolic compound such as heat resistant compound, or thermoset polyimide or polyphenylene sulfide, such compounds filled with mineral filler or glassfiber, and have a wall thickness of 0.100" to 0.200".

The insulating section as outlined above to have a heat transfer value of about 4 to $22 \times 10^{-4}$ cal-cm/sec-cm$^2$ — °C.

The thermally insulated heated sprue bushing of this invention consists of a sprue bushing head 5 and a stem of said sprue bushing 1 and an insulating ring section 3 molded onto the stem of sprue bushing 1 extending from shoulder section of insulator 8 to ⅓ of the stem 1, and a heater band 10 placed around the head of sprue bushing 5, the head 5 having seat for nozzle of injection press 4 and sprue bushing orifice 13 and passage way 2 through sprue bushing, the thermally insulated heated sprue bushing mounted in die block 6, and electric wires 9 connected to heater band 10, with adequate space 12 between the heater coil on head 5 of the sprue bushing and the sprue bushing head well diameter 11, to prevent contact of heater band 10 to the die block mount section 6.

In regard to the thermal insulator segment it is noted above that the thermal insulating ring section 3 is molded onto the sprue bushing, but as an alternate to this the thermal insulator segment can be a separate molded segment inserted into a suitable cored out well of die block 6 as shown in FIG. 4. The sprue bushing thermal insulator 7 is shown in FIG. 4 fitting in well 14 of die block 6.

Thermal insulating ring section 3 and thermal insulator 7 can also be described as thermal barriers.

The thermal barriers 3 and sleeve 7 are so positioned at the shoulder and the juncture of the stem of the sprue bushing and in conjunction with the heater band positioned around the sprue bushing head that in molding the sprue is pulled out or "broken" at the orifice 13. This will be readily understood by those knowledgeable in the art of molding.

Suitable materials for the sprue bushing thermal insulating segments 3 or 7 having a melt point above melt temperature of the compound being molded are glass fiber filled or mineral filled phenolic compounds, polyimide thermoset compounds or polyphenylene sulfide compounds.

Mineral filler is identified as an inorganic compound such as for example wollastonite which is a calcium silicate compound. Other mineral fillers could be asbestos or various silicates, which are well known in the art.

Having described my invention, I claim:

1. In plastic molding apparatus comprising a sprue bushing and a heater band positioned around a radially extending head section of said sprue bushing, wherein the improvement comprises:
- (a) Molded plastic insulation on a stem section and adjoining radially extending surface of said head section of said sprue bushing and an intermediate surfaces therebetween,
- (b) said molded plastic thermal insulating section in said stem section having the same outer diameter as the sprue bushing stem, and
- (c) said molded plastic thermal insulating section molded of polyphenylene sulide compound.

2. In plastic molding apparatus comprising a sprue bushing and a heater band positioned around a head section of said sprue bushing of claim 1, wherein the improvement comprises: molded plastic insulating section molded of plastic material selected from the group consisting of heat resistant phenolic compound, polyimide thermoset compound, and polyphenylene sulfide.

3. In plastic molding apparatus, comprising a thermally insulated heated sprue bushing in plastic molding, comprising a sprue bushing and a heater band positioned around head section of said sprue bushing of claim 1, wherein the improvement comprises: molded plastic thermal insulating section and said molded plastic thermal insulating section contain fillers from the group consisting of mineral filler and glass fibers.

* * * * *